(12) United States Patent
Kim et al.

(10) Patent No.: US 7,883,795 B2
(45) Date of Patent: *Feb. 8, 2011

(54) SECONDARY BATTERY

(75) Inventors: Yong-Sam Kim, Suwon-si (KR); Ki-Ho Kim, Suwon-si (KR); Jae-Yul Ryu, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1087 days.

This patent is subject to a terminal disclaimer.

(21) Appl. No.: 11/231,428

(22) Filed: Sep. 20, 2005

(65) Prior Publication Data

US 2006/0068277 A1 Mar. 30, 2006

(30) Foreign Application Priority Data

Sep. 24, 2004 (KR) .................... 10-2004-0077057

(51) Int. Cl.
*H01M 2/26* (2006.01)
(52) U.S. Cl. ..................................... 429/161; 429/211
(58) Field of Classification Search ................ 429/161, 429/211
See application file for complete search history.

(56) References Cited

U.S. PATENT DOCUMENTS

| | | | |
|---|---|---|---|
| 4,292,381 A | | 9/1981 | Klein |
| 5,773,164 A | * | 6/1998 | Venkatesan et al. ......... 429/161 |
| 6,027,831 A | | 2/2000 | Inoue et al. |
| 6,040,086 A | * | 3/2000 | Yoshida et al. .............. 429/211 |
| 6,114,062 A | | 9/2000 | Motomura et al. |
| 2001/0036574 A1 | * | 11/2001 | Fukuda et al. .............. 429/161 |
| 2001/0049054 A1 | | 12/2001 | Enomoto et al. |
| 2002/0004162 A1 | * | 1/2002 | Satoh et al. ................... 429/94 |
| 2003/0198868 A1 | | 10/2003 | Takeuchi et al. |

FOREIGN PATENT DOCUMENTS

| | | |
|---|---|---|
| CN | 1366360 A | 8/2002 |
| JP | 11-67216 | 3/1999 |
| JP | 11-317214 A | 11/1999 |
| JP | 2000-150306 A | 5/2000 |
| JP | 2000-251867 | 9/2000 |
| JP | 2002-008708 | 1/2002 |

(Continued)

OTHER PUBLICATIONS

Machine Translation of JP2000-251867 published Sep. 14, 2000.*

(Continued)

*Primary Examiner*—Robert Hodge
(74) *Attorney, Agent, or Firm*—Christie, Parker & Hale, LLP

(57) ABSTRACT

A secondary battery includes an electrode assembly including a positive electrode and a negative electrode, and a separator interposed therebetween. Each of the positive and negative electrodes have uncoated regions without active material along an edge. A container is also included for receiving the electrode assembly. A cap assembly is fixed to the container to seal the container. A lead element covers an entire surface of an uncoated region to contact and combine with the uncoated region. A tab extends from the lead element to be disposed within the range of the lead element.

15 Claims, 7 Drawing Sheets

FOREIGN PATENT DOCUMENTS

| | | |
|---|---|---|
| JP | 2002-279961 A | 9/2002 |
| JP | 2002-279962 A | 9/2002 |
| JP | 2003-007346 | 1/2003 |
| JP | 2004-111300 | 4/2004 |

OTHER PUBLICATIONS

Patent Abstracts of Japan, Publication No. 2000-251867; Publication Date: Sep. 14, 2000; in the name of Kitaoka.

Patent Abstracts of Japan, Publication No. 2004-111300; Publication Date: Apr. 8, 2004; in the name of Sasaki.

U.S. Office action dated Apr. 2, 2009, for cross-reference U.S. Appl. No. 11/156,609.

U.S. Office action dated Oct. 14, 2009, for cross-reference U.S. Appl. No. 11/156,609.

* cited by examiner

SECONDARY BATTERY

CROSS REFERENCE TO RELATED APPLICATION

This application claims priority to and the benefit of Korean patent application No. 10-2004-0077057 filed in the Korean Intellectual Property Office on Sep. 24, 2004, the entire disclosure of which is incorporated herein by reference.

FIELD OF THE INVENTION

The present invention relates to a secondary battery, and more particularly, to a lead element and a tab connecting an electrode assembly and a terminal in a secondary battery.

BACKGROUND OF THE INVENTION

Depending on the use or the power capacity of the battery, the secondary batteries may be classified into lower-power batteries (hereinafter "small battery") in which one to several battery cells are made into a battery pack, and bulk-size batteries for driving motors (hereinafter "large battery") in which several to tens of battery cells are connected to form a pack.

Small batteries are used as the power source for various portable electronic devices such as cellular phones, laptop computers, and camcorders. Large batteries can be suitable for the power source of motor driven devices such as the hybrid electric vehicles, wireless vacuum cleaners, motorbikes, or motor scooters.

Generally, small batteries have square and cylindrical shapes, when they are made of one cell. The small battery includes an electrode assembly in which a separator as an insulator is interposed between a positive plate and a negative plate, which are spiral-wound together. The electrode assembly is inserted inside a cylindrical container to form the battery.

A conductive tab, which plays a role in collecting the current produced when the battery is operated, is attached to the positive and negative electrodes. The conductive tab is attached to the electrode assembly by welding, etc., and induces the current produced from the positive and negative electrodes to respective positive and negative terminals.

In the case that the above structure of the small battery is applied to the large battery, the dynamic kinetics necessary for large batteries are not satisfied in terms of capacity and power. Accordingly, there have been provided secondary batteries including a multi-tab structure in which plural tabs are attached to the electrode assembly. Furthermore, there have been provided secondary batteries including a lead element of a plate shape in which a plate is used as the lead element.

The secondary battery with the above structure may have a cylindrical or a hexahedral shape, such as a square-type battery. Plural secondary batteries (e.g. 40 batteries) are made into a battery module.

The dynamic kinetics of the secondary battery for a battery module requiring high power and bulk size require not only a high energy density per unit volume for each of the secondary batteries but also consideration for the battery module's current collecting capacity.

SUMMARY OF THE INVENTION

A secondary battery is proposed in which the contact resistance between the collector plate and the electrode assembly connected to the collector plate is reduced to enhance the collecting efficiency.

According to one aspect of the present invention, a secondary battery include an electrode assembly including a positive electrode and a negative electrode, and a separator interposed therebetween. The positive and negative electrodes each has an uncoated region without active material along an edge. A container is adapted to receive the electrode assembly, and a cap assembly is fixed to the container to seal the container. A lead element covers an entire surface of the uncoated region and contacts and combines with the uncoated region. A first tab extends from the lead element and is disposed within the range of the lead element.

The lead element can be integrally formed with the first tab.

The lead element can be a positive lead element and the battery can also include a negative lead element, which are respectively combined with the positive uncoated region and the negative uncoated region. The positive lead element and the negative lead element can be electrically connected to a positive terminal and a negative terminal of the cap assembly, respectively.

The positive lead element and the negative lead element can be electrically connected to the positive terminal and the negative terminal, respectively, through connecting members connecting the first tab to the positive terminal and a second tab to the negative terminal.

The first tab can be a positive tab or a negative tab, and can be combined with the positive lead element or the negative lead element, respectively. The positive tab and the negative tab can be extended to the outside of the range of the positive lead element and the negative lead element and can be directly connected to the positive terminal and the negative terminal, respectively.

The lead element can have a plurality of lead plates formed by splitting the lead element into at least two plates closely contacting each other at a contact surface and combined with the uncoated region.

The first tab can be disposed in the center of the contact surface of the lead plates.

The lead plates can have a symmetrical shape with respect to the contact surface.

The lead element can be formed with a single plate member.

The first tab can be formed to be extended from the edge of the lead element.

The lead element can be fixed to the uncoated region by laser welding.

The cap assembly includes a positive cap assembly and a negative cap assembly facing each other in the container and combined with the container.

The battery may have a substantially hexahedral shape.

The battery may also be adapted to be used in a motor driven device.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
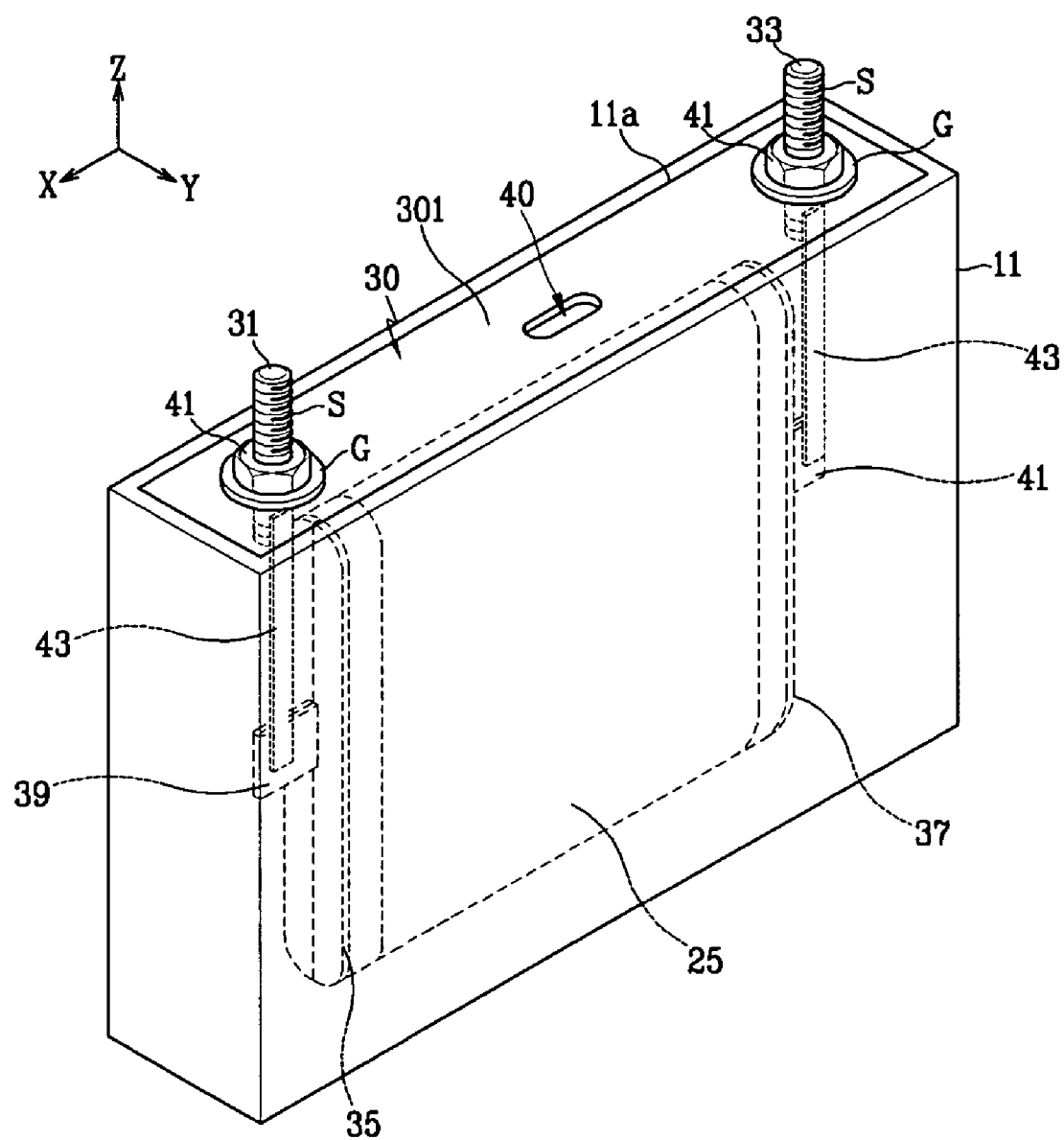
FIG. 1 is a perspective view of a secondary battery according to one embodiment of the present invention.
Figure 2:
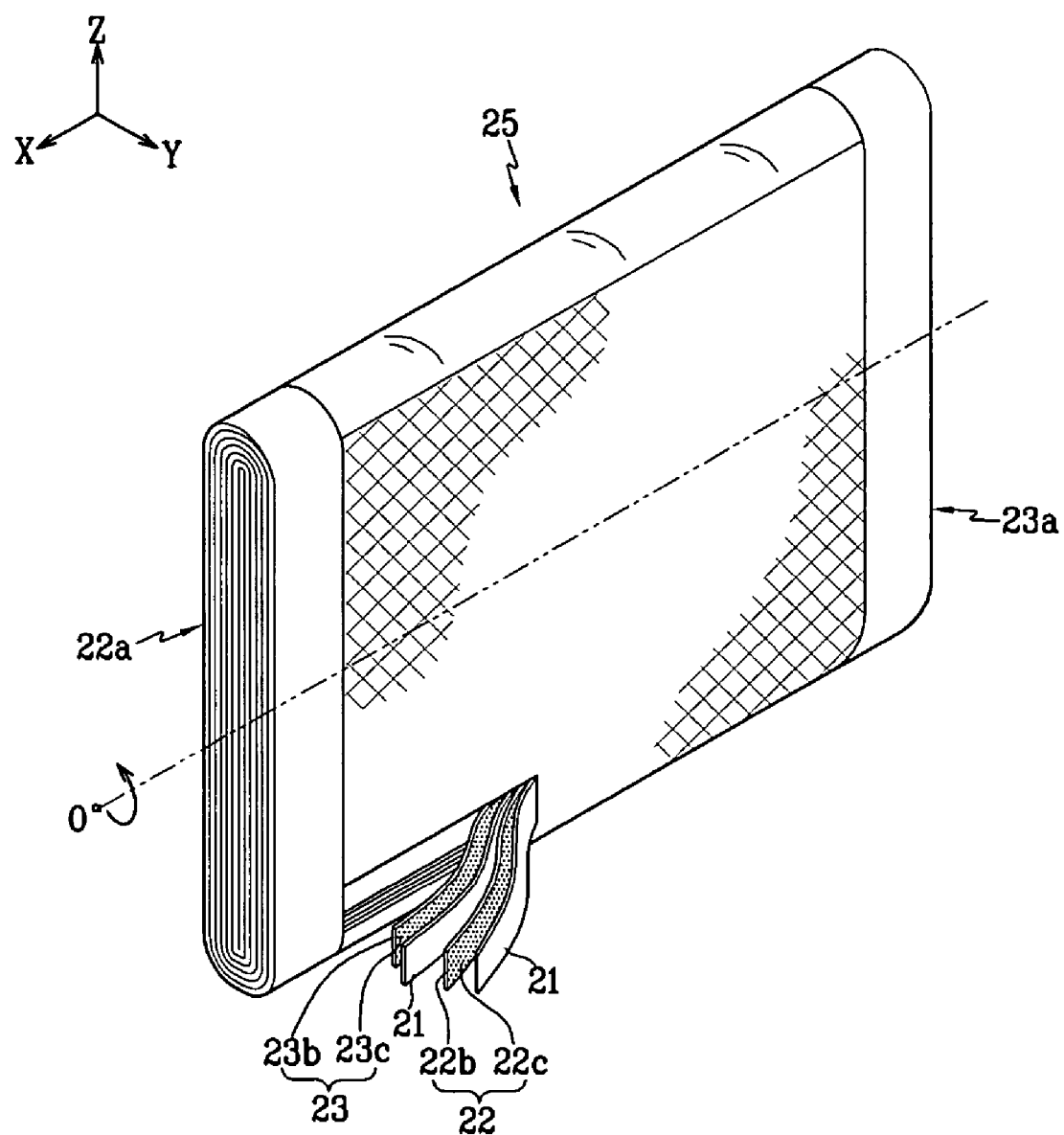
FIG. 2 is a perspective view of an electrode assembly of the secondary battery according to one embodiment of the present invention.

As shown in FIGS. 1 and 2, a secondary battery is a square type battery, which includes a container 11 of a hexahedral shape having an opening, an electrode assembly 25 including a positive electrode 22, a negative electrode 23, and a separator 21 of insulating material interposed between those two electrodes to be mounted in the container, and a cap assembly 30 sealing the opening of the container 11.

The container 11 is made of conductive metal, such as aluminum, aluminum alloy, or steel plated with nickel, and it has a hexahedral shape which has the opening 11a to receive the electrode assembly 25 inside the container 11. However, it is not necessary for its shape be limited to the hexahedral shape.

The electrode assembly 25 has a spiral mound or "jellyroll" structure formed by interposing the separator 21 between the positive electrode 22 and the negative electrode 23, and winding them together in a spiral. After the electrode assembly 25 is formed in a jellyroll structure, it is pressed to finally form a plate type shape.

A positive uncoated region 22a and a negative uncoated region 23a are formed on respective ends of the electrodes assembly 25, opposite to each other. The positive uncoated region 22a and the negative uncoated region 23a are arranged in multiple layers to be opposite to each other since the electrode assembly 25 has a jellyroll configuration, as mentioned above.

The uncoated regions 22a and 23a are regions which are left uncoated with the corresponding active materials 22c and 23c along respective edges of a positive collector 22b and a negative collector 23b.

The electrode assembly 25 is mounted inside the container 11 while maintaining a state where the uncoated regions 22a and 23a are arranged on opposite ends.

The cap assembly 30 includes a base plate 301 fixed to the opening 11 a of the container 11 by welding to seal the container 11.

A positive terminal 31 and a negative terminal 33 are fixed to the base plate 301 while exposing a part thereof outside the container 11.

A screw thread S is formed on the outer circumference surface of the positive terminal 31 and the negative terminal 33, which can be fixed to the base plate 301 by a nut 41 fastened to the screw thread S in a state of interposing a gasket G between the base plate 301 and the nut 41.

In addition, the base plate 301 can further include a vent member 40 and an electrolyte injection hole (not shown).

A positive lead element 35 and a negative lead element 37 contact the positive uncoated region 22a and the negative uncoated region 23a, respectively. The positive lead element 35 and the negative lead element 37 also respectively couple to the positive terminal 31 and the negative terminal 33.

The positive terminal 31 and the negative terminal 33 have a cylindrical shape with a predetermined height, and the screw thread S is formed on the outer circumference surface thereof as mentioned above. The length of the terminals 31 and 33 may be such that when several secondary batteries are made into a battery module, connection members are allowed for electrically connecting the batteries to be fastened to the terminals 31 and 33 while the terminals 31 and 33 are positioned inside and outside the container 11.

The positive lead element 35 and the negative lead element 37 are disposed inside the container 11 to be respectively contacted with the positive uncoated region 22a and the negative uncoated region 23a, and therefore, they substantially connect the terminals 31 and 33 and the electrode assembly 25 electrically. The positive lead element 35 and the negative lead element 37 are contacted with and fixed to the entire surface of the positive uncoated region 22a and the negative uncoated region 23a by welding, covering the entire surface thereof.

In the embodiment shown in FIGS. 1 and 2, the positive lead element 35 and the negative lead element 37 have a structure to prevent lowering the collection efficiency due to the contact resistance.

Figure 3:
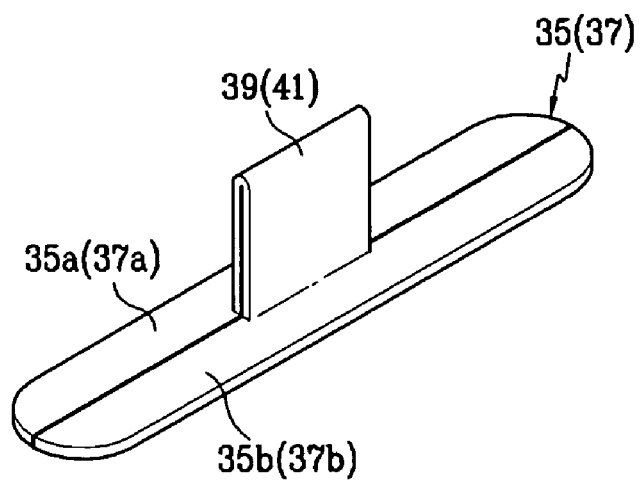
FIG. 3 is a perspective view of a lead element and a tab according to an embodiment of the present invention.

FIG. 3 shows such a structure in more detail. Since the positive lead element 35 and the negative lead element 37 of the present embodiment are formed to have the same shape, FIG. 3 shows them in one drawing for convenience, and accordingly, the positive lead element 35 and the negative lead element 37 will be described together in the following.

As shown in FIGS. 1-3, the positive lead element 35 and the negative lead element 37 have a plurality of lead plates 35a, 35b, 37a and 37b formed by splitting the lead element into at least two plates and arranged in a state of closely contacting with each other. In the present embodiment, the positive lead element 35 and the negative lead element 37 are comprised respectively of the two lead plates 35a and 35b, and 37a and 37b having a symmetrical shape with respect to the contact surface.

In the positive lead element 35 and the negative lead element 37, tabs 39 and 41 extended from the respective lead elements 35 and 37 are disposed within the range of the lead elements 35 and 37.

The tabs 39 and 41 of the present embodiment have a predetermined length, and they are arranged to be perpendicular to the lead plates 35a, 35b, 37a and 37b while positioned at the center of the contact surface of the lead plates 35a, 35b, 37a and 37b.

Figure 4:
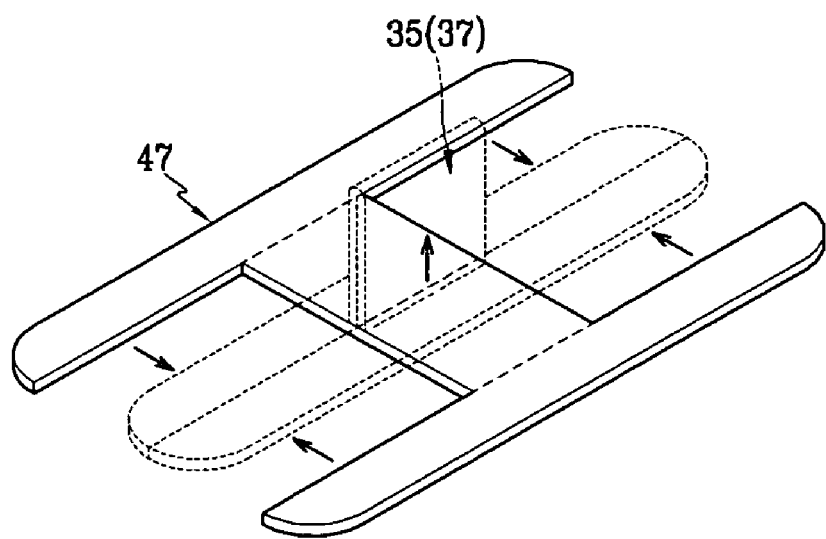
FIG. 4 is a drawing illustrating the manufacturing process of the lead element and the tab according to the embodiment shown in FIG. 3.

In the present embodiment, the lead elements 35 and 37 and the tabs 39 and 41 are formed with a single plate member. That is, as shown in FIG. 4, a single plate member 47 prepared with a predetermined shape is processed according to a predetermined sequence to thereby form the positive lead element 35 and the negative lead element 37 of the above shape.

In some embodiments, the respective lead plates 35a, 35b, and 37a, 37b are respectively fixed to each other by welding. This is because, when the positive lead element 35 and the negative lead element 37 are respectively electrically connected to the positive uncoated region 22a and the negative uncoated region 23a, the resistance by the contact state between the respective lead plates 35a, 35b, and 37a, 37b can be reduced.

Furthermore, since the lead elements 35 and 37 and the corresponding tabs 39 and 41 are formed with a single member as mentioned above, that is, integrally formed, the contact resistance between each lead element and tab can also be minimized.

In addition, in the present embodiment, since the lead elements 35 and 37 are respectively combined with the uncoated regions 22*a* and 23*a* covering the entire surfaces of the uncoated regions 22*a* and 23*a*, the contact area between them is increased and accordingly, the collecting efficiency of the current induced from the electrode assembly 25 to the positive terminal 31 and the negative terminal can be maximized.

The electrical connection between the terminals 31 and 33 and the tabs 39 and 41 can be achieved by separate connecting members 43 and 45 connected between them.

Figure 5:
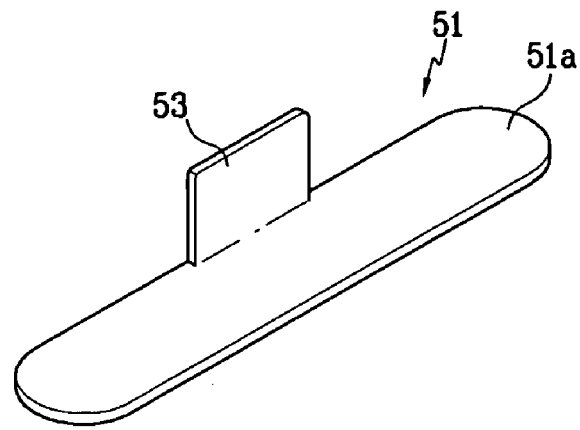
FIG. 5 is a perspective view of a lead element and a tab according to another embodiment of the present invention.

With reference to FIG. 5, a lead element 51 has a lead plate 51*a* which contacts and combines with the uncoated region covering the entire surface of the uncoated region as shown in FIG. 1. However, the lead plate 51*a* is comprised of a single plate member different from that of the first embodiment. A tab 53 is formed to be extended from the edge of the lead element 51 being perpendicular to the lead element 51.

In this embodiment, the tab 53 is positioned within the range of the lead element while arranged in the side of the lead element 51, and the lead element 51 is fixed to the entire surface of the uncoated region while comprised of the lead plate 51*a*, which thereby can increase the collecting efficiency as in the first embodiment.

Figure 6:
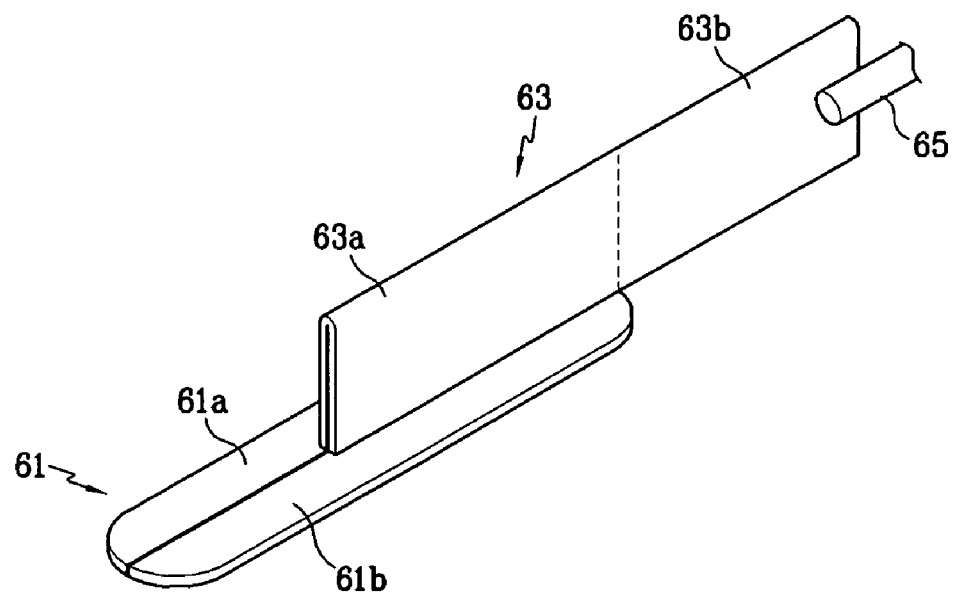
FIG. 6 is a perspective view of a lead element and a tab according to yet another embodiment of the present invention.

According to the embodiment shown in FIG. 6, a lead element 61 has two lead plates 61*a* and 61*b*, similar to the lead element shown in FIGS. 1, 3 and 4.

A tab 63 is arranged in the center region of the lead plates 61*a* and 61*b*, as in the embodiment shown in FIGS. 1-4, to be integrally formed with the lead plates 61*a* and 61*b*. The tab 63 has not only a first portion 63*a* disposed within the range of the lead element 61 but also a second portion 63*b* extended from the first portion 63*a* to be disposed outside the range of the lead element 61.

The lead element 61 and the tab 63 connect the second portion 63*b* of the tab 63 disposed outside the range of the lead element 61 directly to a terminal 65 to form an electrical path between them. The second portion 63*b* can be formed separately from or formed integrally with the terminal 65, but its shape is not limited thereto and can take various other forms.

Accordingly, when a secondary battery is manufactured with the lead element 61 and the tab 63 of this embodiment, it does not need a separate connecting member to connect between the tab 63 and the terminal 65, which thereby can simplify the manufacturing process.

The lead elements and the tabs of the embodiments shown in FIGS. 5 and 6 can be applied to both of the positive electrode and the negative electrode of the present invention.

Figure 7:
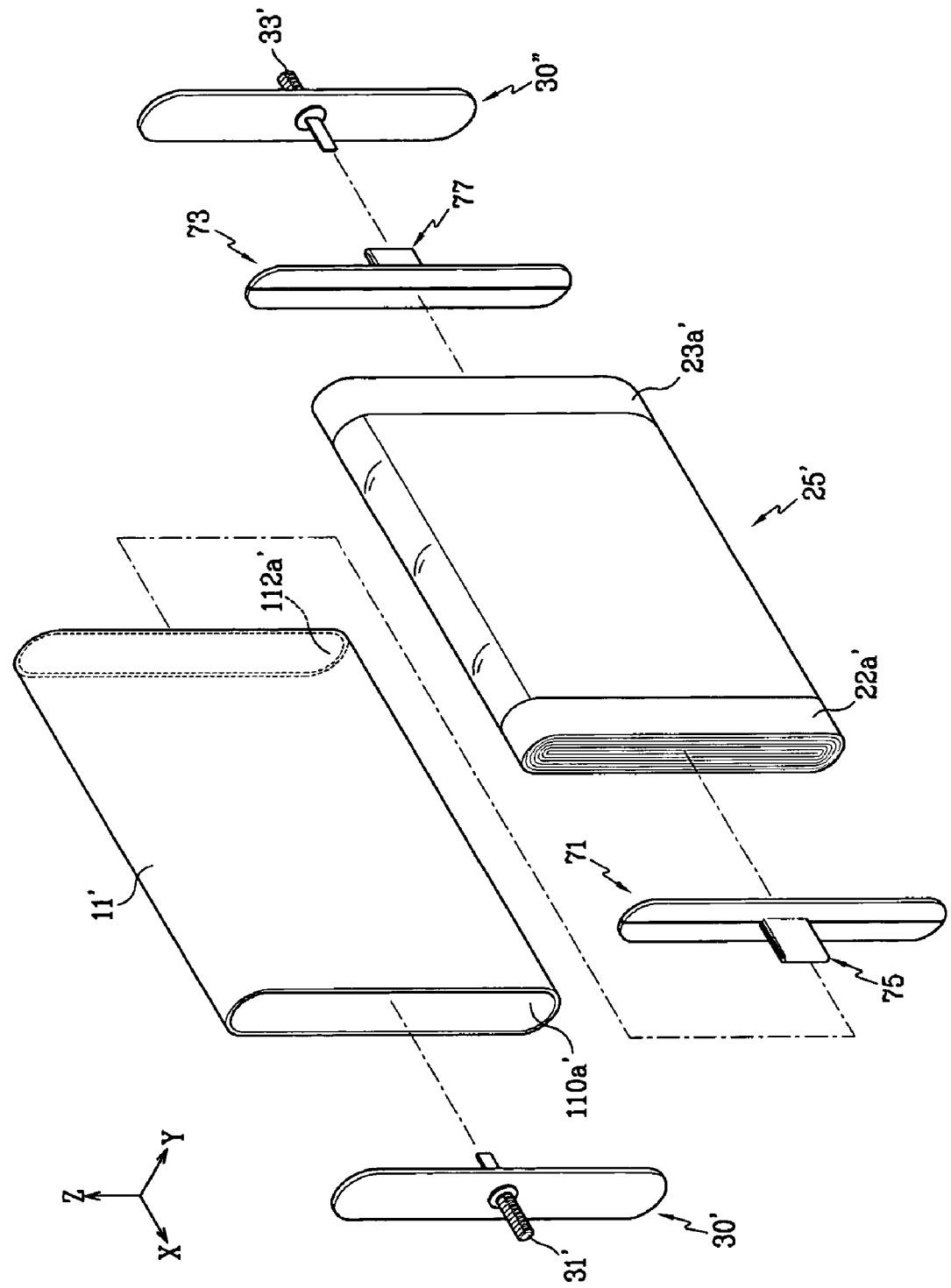
FIG. 7 is an exploded perspective of a secondary battery with the lead element and the tab shown in FIG. 3.

FIG. 7 shows another secondary battery with the lead element and the tab similar to that shown in FIGS. 1, 3 and 4.

As shown in FIG. 7, a secondary battery has a long, essentially hexahedral shape with rounded corners along the length (in the X-axis direction of the drawing) of an electrode assembly 25'. The electrode assembly 25 is inserted into a container 11' having openings formed at both ends along the length, and the openings at both of the ends of the container 11 are sealed by cap assemblies 30' and 30"

The electrode assembly 25' has the same structure of the electrode assembly of FIG. 2, the detail description of which will be omitted herewith. The electrode assembly 25' is inserted inside the container 11' so that a positive uncoated region 22*a'* and a negative uncoated region 23*a'* are disposed at both of the openings 110*a'* and 112*a'* of the container 11'.

The cap assemblies 30' and 30" have a positive terminal 31' and a negative terminal 33', respectively, and are fixed to the openings 110*a'* and 112*a'* of the container 11' by welding.

After such a secondary battery is manufactured, it has a structure such that the cap assemblies 30' and 30" are disposed in the two openings 110*a'* and 112*a'* facing each other in the container 11', and the positive terminal 31' and the negative terminal 33' disposed in the cap assemblies 30' and 30" are protruded at both ends of the container 11', which is different from FIG. 1.

In such a secondary battery, the positive lead element 71 and the negative lead element 73 having the same structure as those shown in FIGS. 1-4 are fixed to the positive uncoated region 22*a'* and the negative uncoated region 23*a'*, respectively. A tab 75 formed on the positive lead element 71 is directly connected to the positive terminal 31', and a tab 77 formed on the negative lead element 73 is directly connected to the negative terminal 33'.

Figure 8:
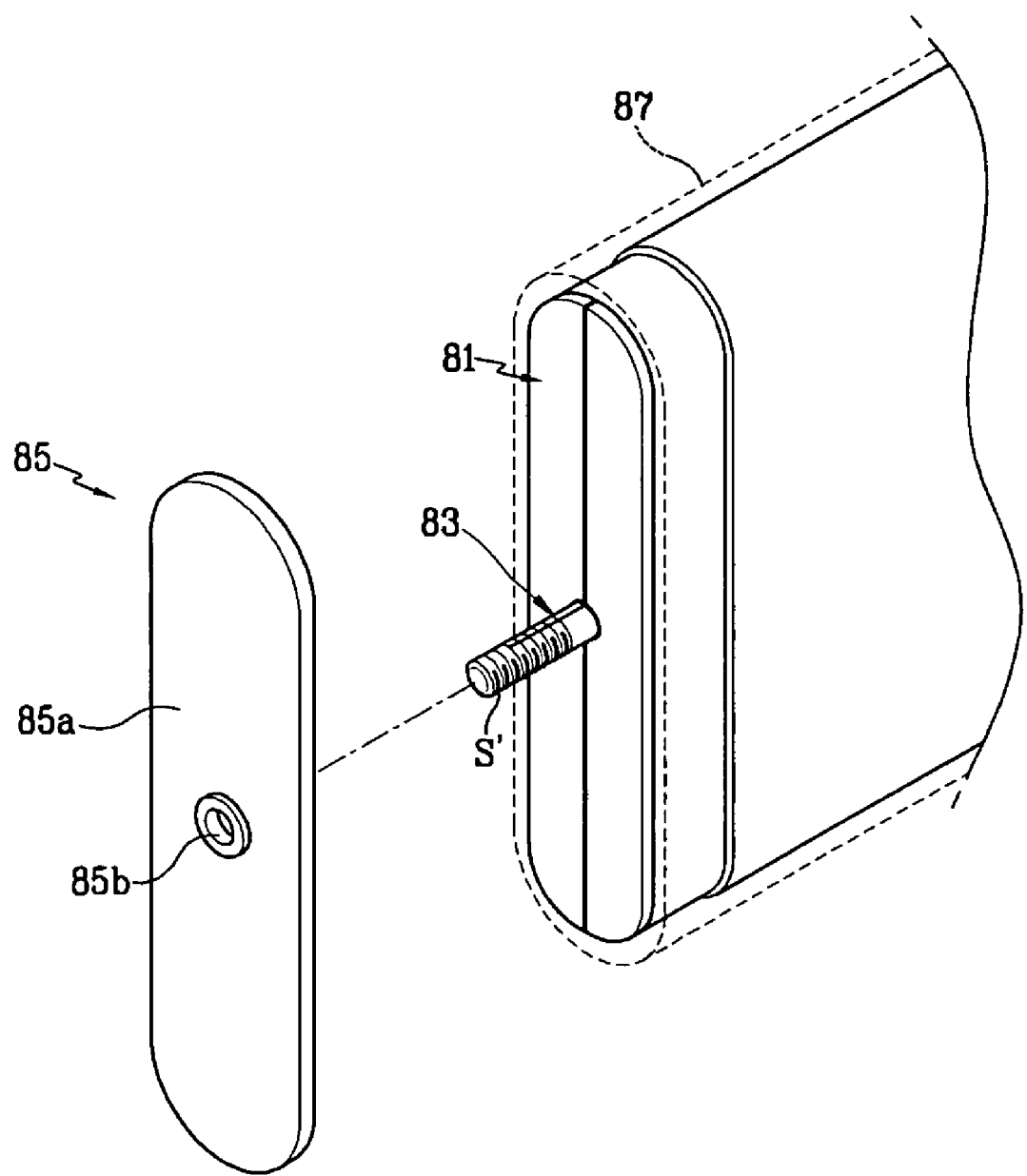
FIG. 8 is a perspective view illustrating a lead element and a tab according to still another embodiment of the present invention.

The tab can play an additional role of a terminal by itself by extending it outside the container. FIG. 8 is a drawing illustrating this. A tab 83 formed on a lead element 81 has a screw thread S' on a part thereof, and it is exposed outside a container 87 through a hole 85*b* formed on a base plate 85*a* of a cap assembly 85.

If the tab 83 is extended to the outside of the container 87 and used as a terminal of the secondary battery as mentioned above, the tab and the terminal which are separately formed and perform only their own function can be integrated to form one element, which can save the manufacturing cost and reduce the manufacturing steps.

The structure of the lead element and the tab connected to the electrode assembly as described can thus increase the collecting efficiency. In particular, since the lead element has a plate shape to cover the entire surface of the uncoated region of the electrode assembly, the collecting capacity can be increased. Moreover, if the lead element and the tab are integrally formed, the internal resistance can be minimized to thereby satisfy the dynamic kinetics necessary for large batteries.

Therefore, various embodiments of secondary batteries of the present invention can be effectively used as the power source for hybrid electric vehicles requiring high power and bulk capacity, but its use is not limited to the hybrid electric vehicles. That is, the above systems can be effectively used for other motor driving battery modules such as electric vehicles, motor scooters, motorbikes, or electric vacuum cleaners.

Figure 9:
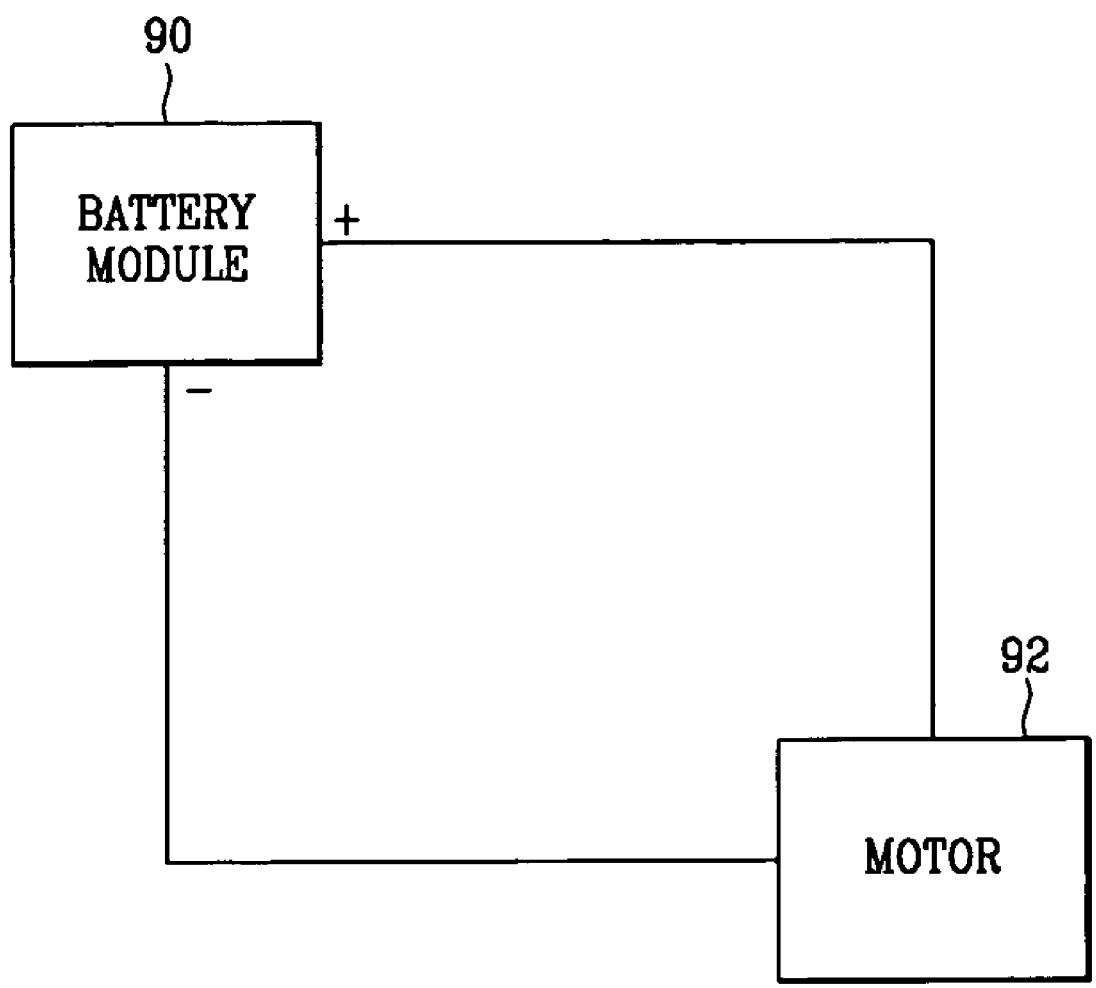
FIG. 9 is a schematic block diagram showing a secondary battery module having a secondary battery driving a motor according to the present invention.

FIG. 9 is a schematic block diagram of a secondary battery module 90 having a secondary as discussed FIGS. 1 to 8 driving a motor 92.

Although various embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hexahedral secondary battery comprising: an electrode assembly including a positive electrode and a negative electrode, and a separator interposed therebetween, the positive and negative electrodes each having an uncoated region without active material along an edge thereof, the positive and negative electrodes being spiral wound with the edge of the uncoated region of each electrode forming an end surface; a container receiving the electrode assembly; a cap assembly fixed to the container to seal the container; a lead element contacting the entire end surface of one of the uncoated regions; and a first tab extended from the lead element, wherein the lead element comprises at least two lead plates that are connected to each other by the first tab, each lead plate having a long side edge extending along its length, wherein the two lead plates physically contact each other along their respective long side edges, wherein the first tab extends from the long side edges of the lead plates, wherein the first tab has a first portion and a second portion, the second portion extending past an end of the lead element and is electrically connected to a positive terminal of the cap assembly, wherein the lead element is a positive lead element combined with the uncoated region of the positive electrode, and the positive lead element is electrically connected to the positive terminal of the cap assembly, through the second portion of the first tab electrically connecting the first portion of the first tab to the positive terminal, and wherein the lead element is integrally formed with the first tab.

2. The secondary battery of claim 1, further comprising a negative lead element contacting the entire end surface of the uncoated region of the negative electrode and the negative lead element is electrically connected to a negative terminal of the cap assembly; and a second tab extending from the negative lead element, wherein the negative lead element comprises at least two lead plates that are connected to each other by the second tab, each lead plate having a long side edge extending along its length, wherein the two lead plates of the negative lead element physically contact each other along their respective long side edges, wherein the second tab extends from the long side edges of the lead plates of the negative lead element and wherein the second tab has a first portion and a second portion, the second portion of the second tab extending past an end of the negative lead element and is electrically connected to the negative terminal of the cap assembly.

3. The secondary battery of claim 2, wherein the negative lead element is electrically connected to the negative terminal, through the second portion of the second tab electrically connecting the first portion of the second tab to the negative terminal.

4. The secondary battery of claim 1, wherein the two lead plates closely contact each other at a contact surface along their respective long side edges.

5. The secondary battery of claim 4, wherein the first portion of the tab is disposed in the center of the contact surface of the lead plates.

6. The secondary battery of claim 4, wherein the lead plates have a symmetrical shape with respect to the contact surface.

7. The secondary battery of claim 1, wherein the lead element is formed with a single plate member that is split into the two lead plates connected by the first tab.

8. The secondary battery of claim 7, wherein the first tab is extended from an edge of the lead element between the two lead plates.

9. The secondary battery of claim 1, wherein the lead element is fixed to the uncoated region by laser welding.

10. The secondary battery of claim 1, wherein the cap assembly includes a positive cap assembly and a negative cap assembly facing each other in the container and combined with the container.

11. The secondary battery of claim 1, wherein the secondary battery is adapted to be used in a motor driven device.

12. The secondary battery of claim 1, wherein the first tab extends perpendicularly to the two lead plates.

13. The secondary battery of claim 1, wherein the two lead plates and the first tab are formed as a single integral piece.

14. The secondary battery of claim 1, wherein the two lead plates contacting each other are welded to each other.

15. The secondary battery of claim 1, wherein the two lead plates contact each other to form a bottom surface that has a surface area at least as large as a surface area of the end surface.

* * * * *